United States Patent
Yasui

(10) Patent No.: US 11,550,517 B2
(45) Date of Patent: Jan. 10, 2023

(54) STORAGE MEDIUM STORING CONTROL PROGRAM AND INFORMATION PROCESSING APPARATUS

(71) Applicant: BROTHER KOGYO KABUSHIKI KAISHA, Nagoya (JP)

(72) Inventor: Ryo Yasui, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/899,748

(22) Filed: Jun. 12, 2020

(65) Prior Publication Data

US 2020/0406635 A1 Dec. 31, 2020

(30) Foreign Application Priority Data

Jun. 26, 2019 (JP) .............................. JP2019-118791

(51) Int. Cl.
*G06F 3/12* (2006.01)
*B41J 3/407* (2006.01)
(Continued)

(52) U.S. Cl.
CPC .......... *G06F 3/1203* (2013.01); *G06F 3/1205* (2013.01); *G06F 3/1253* (2013.01);
(Continued)

(58) Field of Classification Search
CPC .... G06F 3/1203; G06F 3/1205; G06F 3/1253; G06F 3/1256; B41J 3/4075; B41J 11/008; B41J 11/663
See application file for complete search history.

(56) References Cited

U.S. PATENT DOCUMENTS 8,085,430 B2 * 12/2011 Takayama .............. B41J 3/4075
358/1.11
2007/0223022 A1 9/2007 Suzuki
(Continued)

FOREIGN PATENT DOCUMENTS

JP     2000011082 A * 1/2000
JP     2007-253535 A    10/2007
(Continued)

*Primary Examiner* — Huo Long Chen
(74) *Attorney, Agent, or Firm* — Scully, Scott, Murphy & Presser, PC

(57) ABSTRACT

An information processing apparatus performs: receiving a print instruction for repeatedly printing an object along a particular direction, the print instruction including an image length; determining whether the image length exceeds a particular length; in a case where the image length exceeds the particular length, creating print image data of a first image and a second image, the first and second images including the object arranged repeatedly, a length of the first image being within the particular length, the second image continuing from the first image, a total length of the first and second images being equal to the image length; in a case where the image length does not exceed the particular length, creating print image data of a third image in which the object is arranged repeatedly, a length of the third image being equal to the image length; and outputting the print image data to a printer.

13 Claims, 10 Drawing Sheets

(51) Int. Cl.
   *B41J 11/66*    (2006.01)
   *B41J 11/00*    (2006.01)

(52) U.S. Cl.
   CPC ............ *B41J 3/4075* (2013.01); *B41J 11/008* (2013.01); *B41J 11/663* (2013.01); *G06F 3/1256* (2013.01); *G06F 3/1292* (2013.01)

(56) References Cited

U.S. PATENT DOCUMENTS

| | | | | |
|---|---|---|---|---|
| 2008/0079585 | A1* | 4/2008 | Hirota | G06K 17/0025 340/572.1 |
| 2014/0199105 | A1 | 7/2014 | Tsukada | |
| 2017/0290071 | A1* | 10/2017 | Ito | H04W 76/10 |
| 2018/0056676 | A1* | 3/2018 | Kajihara | B41J 3/36 |
| 2018/0272760 | A1* | 9/2018 | Murayama | B41J 11/008 |
| 2019/0061394 | A1* | 2/2019 | Inoue | B31D 1/026 |

FOREIGN PATENT DOCUMENTS

| | | |
|---|---|---|
| JP | 2013-078905 A | 5/2013 |
| JP | 2014-133377 A | 7/2014 |
| JP | 2016-199000 A | 12/2016 |
| JP | 2016-215615 A | 12/2016 |

* cited by examiner

STORAGE MEDIUM STORING CONTROL PROGRAM AND INFORMATION PROCESSING APPARATUS

CROSS REFERENCE TO RELATED APPLICATIONS

This application claims priority from Japanese Patent Application No. 2019-118791 filed Jun. 26, 2019. The entire content of the priority application is incorporated herein by reference.

TECHNICAL FIELD

This disclosure relates to a storage medium storing a computer program readable by a computer of an information processing apparatus for performing print processing of an image in which an object is repeatedly arranged toward a particular direction. This disclosure also relates to the information processing apparatus.

BACKGROUND

The technique for printing an image in which an object is repeatedly arranged on a tape-like print medium is known.

SUMMARY

An aspect of an object of this disclosure is to appropriately print an image in which an object is repeatedly arranged on a tape-like print medium.

According to one aspect, this specification discloses a non-transitory computer-readable storage medium storing a control program including a set of program instructions for an information processing apparatus including a processor and a communication interface. The set of program instructions, when executed by the processor, causes the information processing apparatus to perform: receiving a print instruction for repeatedly printing an object along a particular direction, the print instruction including an image length that is a length of an image to be printed based on the print instruction; determining whether the image length exceeds a particular length that is set preliminarily; in a case where the image length exceeds the particular length, creating print image data of a first image and a second image, the first image including the object arranged repeatedly based on the print instruction, a length of the first image being within the particular length, the second image continuing from a final part of the first image, the second image including the object arranged repeatedly based on the print instruction, a total length of the first image and the second image being equal to the image length; in a case where the image length does not exceed the particular length, creating print image data of a third image in which the object is arranged repeatedly based on the print instruction, a length of the third image being equal to the image length; and outputting the created print image data to a printer through the communication interface.

According to another aspect, this specification also discloses an information processing apparatus. The information processing apparatus includes a communication interface, a processor; and a memory storing set of instructions. The set of instructions, when executed by the processor, causes the information processing apparatus to perform: receiving a print instruction for repeatedly printing an object along a particular direction, the print instruction including an image length that is a length of an image to be printed based on the print instruction; determining whether the image length exceeds a particular length that is set preliminarily; in a case where the image length exceeds the particular length, creating print image data of a first image and a second image, the first image including the object arranged repeatedly based on the print instruction, a length of the first image being within the particular length, the second image continuing from a final part of the first image, the second image including the object arranged repeatedly based on the print instruction, a total length of the first image and the second image being equal to the image length; in a case where the image length does not exceed the particular length, creating print image data of a third image in which the object is arranged repeatedly based on the print instruction, a length of the third image being equal to the image length; and outputting the created print image data to a printer through the communication interface.

According to still another aspect, this specification also discloses an information processing apparatus. The information processing apparatus includes: reception means for receiving a print instruction for repeatedly printing an object along a particular direction, the print instruction including an image length that is a length of an image to be printed based on the print instruction; determination means for determining whether the image length exceeds a particular length that is set preliminarily; first creation means for, in a case where the image length exceeds the particular length, creating print image data of a first image and print image data of a second image, the first image including the object arranged repeatedly based on the print instruction, a length of the first image being within the particular length, the second image continuing from a final part of the first image, the second image including the object arranged repeatedly based on the print instruction, a total length of the first image and the second image being equal to the image length; second creation means for, in a case where the image length does not exceed the particular length, creating print image data of a third image in which the object is arranged repeatedly based on the print instruction, a length of the third image being equal to the image length; and output means for outputting, to a printer, the print image data created by the first creation means or the second creation means.

BRIEF DESCRIPTION OF THE DRAWINGS

Embodiments in accordance with this disclosure will be described in detail with reference to the following figures wherein.

DETAILED DESCRIPTION

Figure 1:
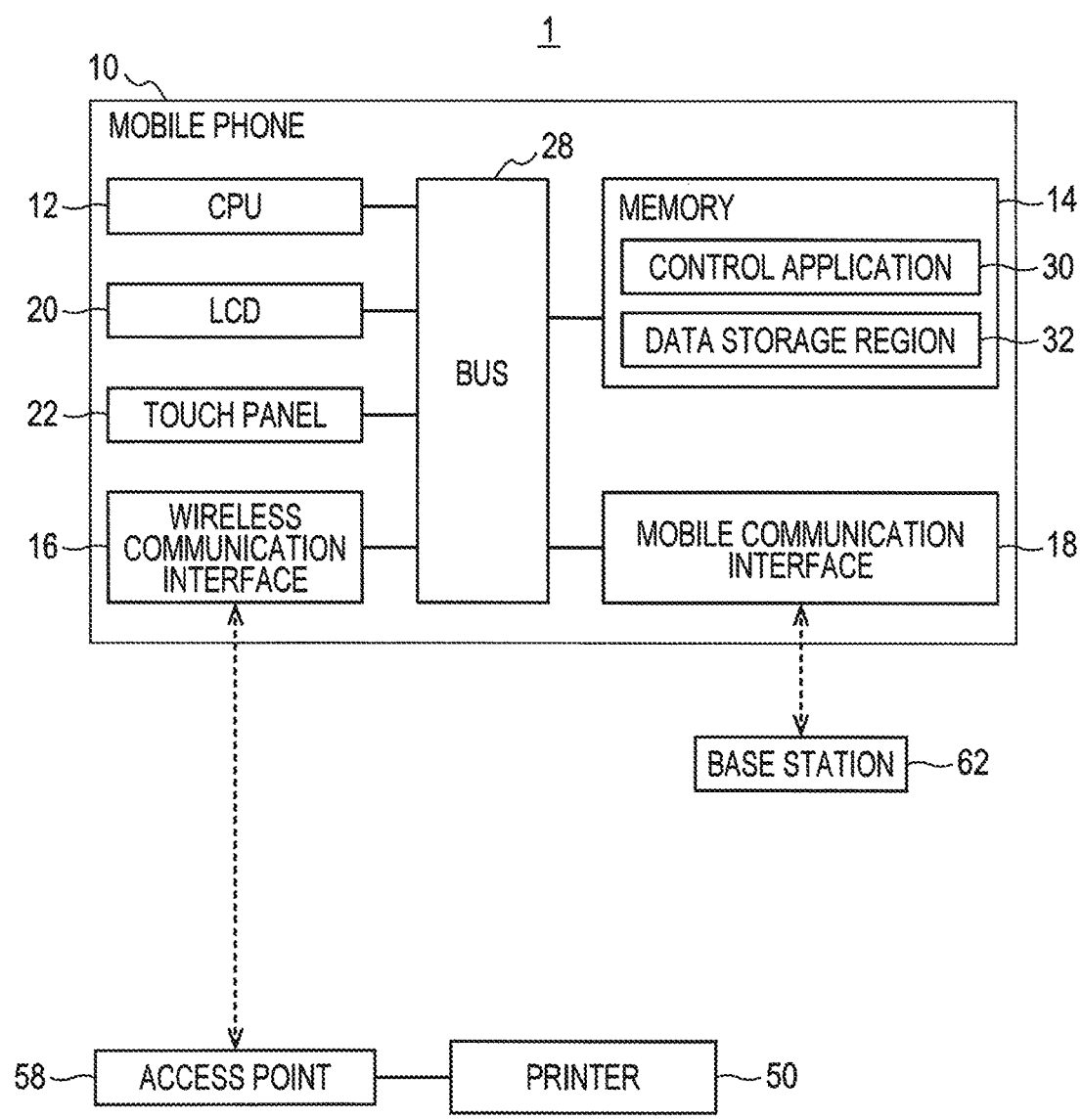
FIG. 1 is a block diagram of a communication system 1.

As shown in FIG. 1, a communication system 1 includes a mobile phone (an example of an information processing apparatus) 10, a printer (an example of a printer) 50, an access point 58, and a base station 62. The printer 50 is a label printer, for example. The printer 50 performs transmission and reception of various information and instruction signals with the mobile phone 10 and, based on controls by the mobile phone 10, creates labels on which objects such as desired texts and images are printed. For example, the printer 50 is a thermal-transfer type printer that uses ink ribbon, that is, a so-called thermal printer. The access point 58 has functions as a wireless LAN access point and a router.

The mobile phone 10 mainly includes a CPU (an example of a computer or processor) 12, a memory 14, a wireless communication interface 16, a mobile communication interface 18, an LCD 20, and a touch panel 22. These components are configured to mutually communicate through a bus 28.

The wireless communication interface 16 performs wireless communication in Wi-Fi™ method based on the IEEE standard 802.11 and other equivalent standards. In other words, the mobile phone 10 accesses the access point 58 and, when the wireless communication in Wi-Fi method becomes possible, the mobile phone 10 is ready to perform data communication with the printer 50 through the access point 58.

The mobile communication interface 18 performs wireless communication with the base station 62 in a mobile communication method. In other words, the mobile phone 10 is configured to perform data communication through the base station 62 when the wireless communication in the mobile communication method becomes possible.

The CPU 12 executes processing in accordance with a control application (an example of a control program) 30 in the memory 14. The control application 30 is a program for allowing the printer 50 to perform print processing by using the mobile phone 10. Note that the CPU 12 executing the control application 30 may be simply called by the program name. For example, the description "the control application 30" may mean "the CPU 12 executing the control application 30".

The memory 14 has a data storage region 32. The data storage region 32 is an area for storing data necessary for executing the control application 30 and so on. The memory 14 is a combination of a RAM, a ROM, a flash memory, an HDD, and a buffer stored in the CPU 12. The memory 14 may be a computer-readable storage medium. The computer-readable storage medium means a non-transitory medium; apart from the above-described examples, the non-transitory medium includes a CD-ROM and a DVD-ROM. The non-transitory medium is also a tangible medium. On the other hand, an electrical signal transmitting a program downloaded from a server or the like on the Internet is also a computer-readable signal medium as a type of computer-readable medium, however it is not included in the non-transitory computer readable storage medium.

The LCD 20 has a display for showing various functions of the mobile phone 10. The touch panel 22 has a touch sensor and placed so as to cover the display of the LCD 20. The touch panel 22 detects users' fingers and touch pen approaching or touching the touch panel 22 and then outputs an electrical signal in response to the detection.

Note that this specification mainly describes the processing of the CPU 12 in accordance with the command written in the program. In other words, the below-described processing such as "determination", "extraction", "selection", "calculation", "decision", "identification", "acquisition", "reception", "control" means the type of processing by the CPU 12. The processing by the CPU 12 includes hardware control through the OS. It should also be noted that the term "acquisition" is a concept which does not require "requesting". In other words, a processing to receive data without request from the CPU 12 is also included within the concept that "the CPU 12 receives data". In addition, the term "data" in this description is represented by computer-readable bit strings. The data of which meaning is substantially the same but the format is different is treated as an identical data. The term "information" in this description is treated in the same manner as the term "data". The processing such as "command", "response", and "request" is executed by communicating information indicating "command", "response", and "request". The processing such as "setting" is executed by storing the inputted setting information into the memory.

Figure 2:
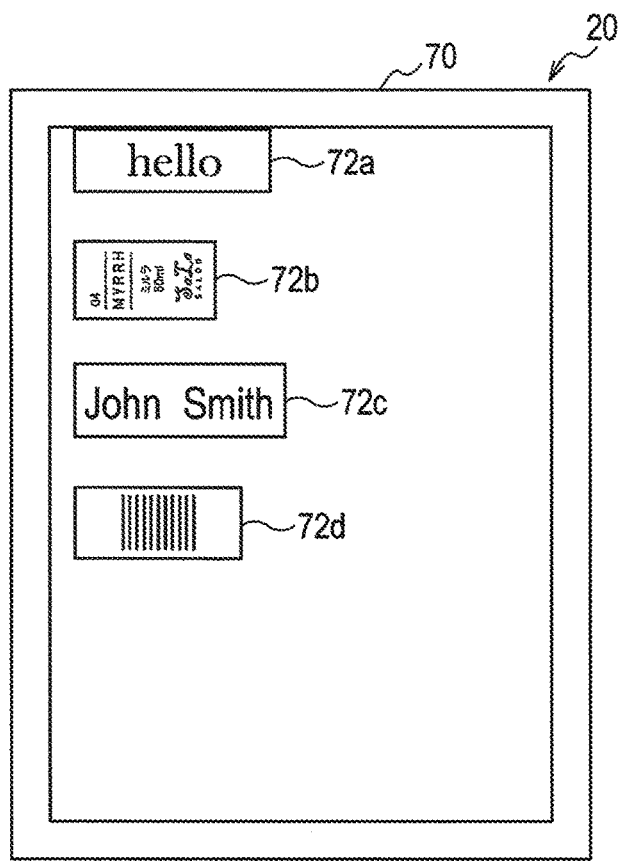
FIG. 2 is a diagram showing a selection screen 70.

In the communication system 1, based on the above-described configuration, an object of a print target on a label which is a print medium in the printer 50 is edited on the mobile phone 10. Specifically, by the processing of the control application 30, the selection screen 70 shown in FIG. 2 is displayed on the LCD 20. A plurality of template images 72a to 72d is displayed on the selection screen 70. The template images 72a to 72d are template images of objects of the print target. The template images 72a to 72d include the template images 72a to 72c of objects formed by character strings and the template image 72d of an object formed by a barcode, and so on.

Figure 3:
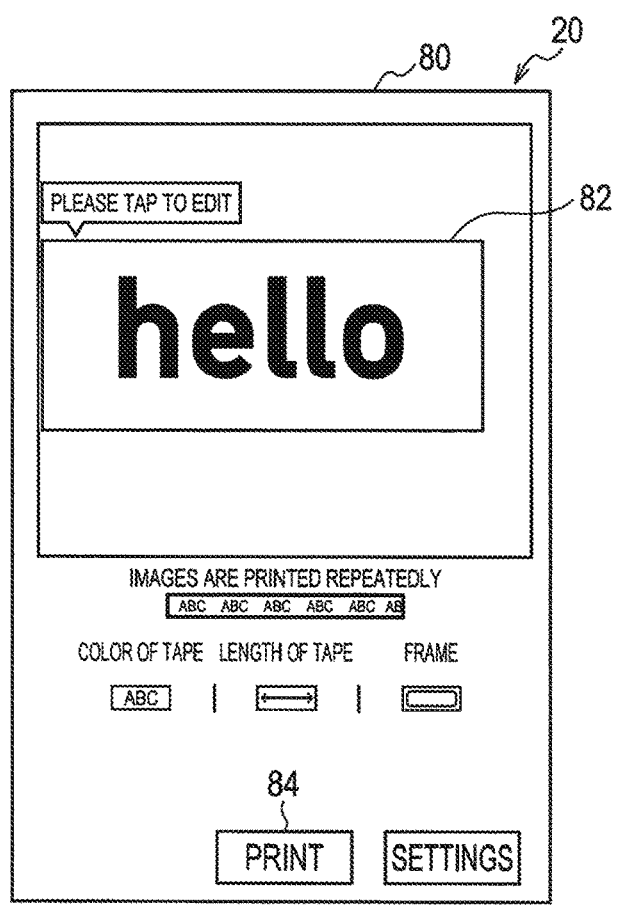
FIG. 3 is a diagram showing an editing screen 80.

When any template image in the selection screen 70 is selected by a user operation, the selection screen 70 is changed into an editing screen 80 shown in FIG. 3 displayed on the LCD 20. An editing image 82 and a print button 84 are displayed on the editing screen 80. The editing image 82 displays an image corresponding to one of the template images 72a to 72d selected in the selection screen 70. In FIG. 3, the image corresponding to the template image 72a is displayed as the editing image 82. Specifically, an object formed by a character string "hello" is displayed.

The editing screen 80 is configured such that the editing image 82 can be operated to edit the character string "hello" displayed as the editing image 82. Then, after completing the editing operation, the print button 84 is operated to create print image data (image data for printing) of the editing image 82. The template image 72a used as the basis of the editing image 82 shown in FIG. 3 is compatible with repetitive print processing. The repetitive print processing is processing to print, on a print medium such as a tape-like label and a ribbon, an image in which an object is repeatedly arranged along a direction in which the tape-like print medium extends. Thus, when the print button 84 is operated in a state where a template image compatible with the repetitive print processing is selected in the selection screen 70 and the editing image 82 corresponding to the selected template image is displayed on the editing screen 80, a repetitive printing execution screen 110 to execute repetitive print processing (see FIG. 4) is displayed on the LCD 20.

The template images 72a, 72c, and 72d among a plurality of template images 72a to 72d displayed on the selection screen 70 are compatible with the repetitive print processing. The template image 72b is not compatible with the repetitive print processing. Thus, when the print button 84 is operated in a state where the template image 72b is selected in the selection screen 70 and the editing image 82 corresponding to the selected template image 72b is displayed on the editing screen 80, no repetitive print processing is executed and a normal label print processing is executed. Specifically, the control application 30 creates print image data of the object displayed as the editing image 82, and transmits the created print image data to the printer 50. As a result, the normal label print processing is executed in the printer 50.

Figure 4:
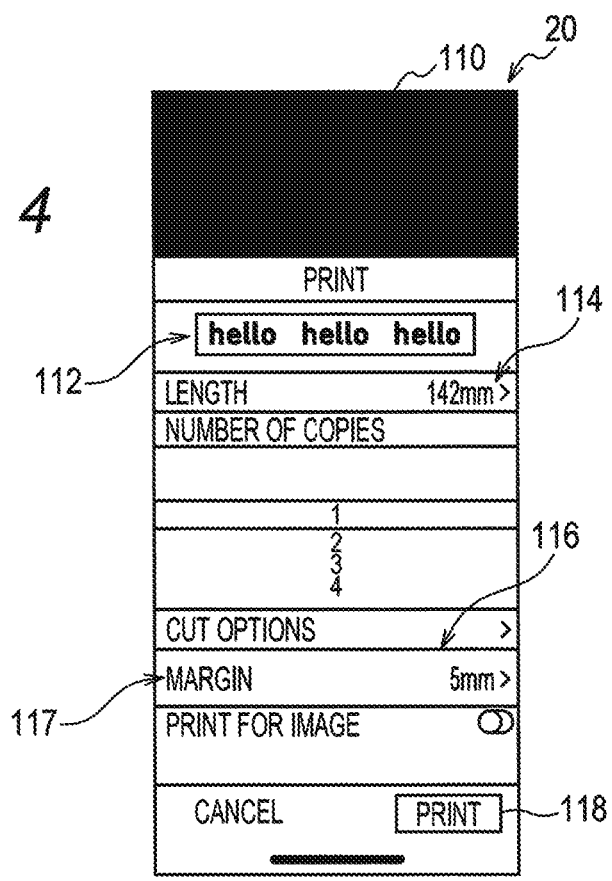
FIG. 4 is a diagram showing a repetitive printing execution screen 110.

When the print button 84 is operated in a state where any of the template images 72a, 72c, and 72d compatible with the repetitive print processing is selected in the selection screen 70 and where the editing image 82 corresponding to the selected template image 72a, 72c, or 72d is displayed in the editing screen 80, the control application 30 displays, on the LCD 20, the repetitive printing execution screen 110 shown in FIG. 4. In the repetitive printing execution screen 110, an image in which an object displayed as the editing image 82 of the editing screen 80 (for example, a character string "hello") is repeatedly arranged is displayed as a preview image 112.

Figure 5:
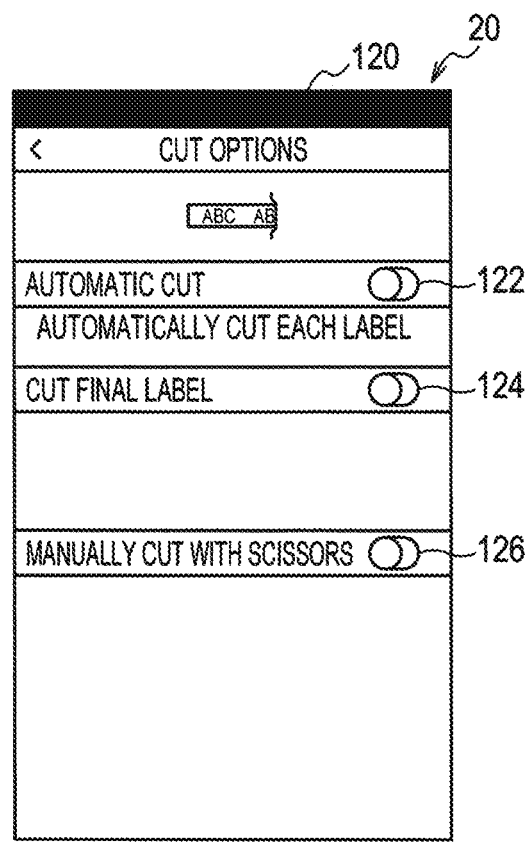
FIG. 5 is a diagram showing a cut-option setting screen 120.

A length setting button 114, a cut option setting button 116, and a margin setting button 117 are also displayed in the repetitive printing execution screen 110. The length setting button 114 is a button to set the length of a tape-like print medium and receives an input of a desired length through an operation of the length setting button 114 to thereby create print image data of the object repeatedly arranged to achieve the inputted length. The cut option setting button 116 is a button to set, after the image is printed on the tape-like print medium, how to cut the print medium. By operating the cut option setting button 116, a cut-option setting screen 120 shown in FIG. 5 is displayed on the LCD 20.

A first selection button 122, a second selection button 124, and a third selection button 126 are displayed on the cut-option setting screen 120. The first selection button 122 is a button to select a cut option "automatic cut" to cut a print medium each time an image is printed on the print medium. Thus, when the first selection button 122 is operated, the print medium is automatically cut in the printer 50 each time single print processing is completed. The second selection button 124 is a button to select, when a plurality of print copies is required, a cut option "cut final label" to cut the print medium after the print operation of the final copy is completed. Thus, when the second selection button 124 is operated, for example, when the number of print copies is two, the printer 50 does not cut the print medium after the print processing of the first copy is completed and automatically cuts the print medium after the second print processing is completed. The third selection button 126 is a button to select a cut option "manually cut" (self-cut) to cut the print medium by the user himself or herself. Thus, when the third selection button 126 is operated, the print medium is not automatically cut even after completing the print processing in the printer 50 but is manually cut by the user.

When any selection button is operated in the cut-option setting screen 120, the repetitive printing execution screen 110 is displayed on the LCD 20 instead of the cut-option setting screen 120. The margin setting button 117 in the repetitive printing execution screen 110 is a button to set, when the object of the print target is arranged repeatedly, the length of the margin between two objects adjacent to each other (that is, the length of the margin between objects). Based on an input of the length of the margin between objects through an operation of the margin setting button 117, the control application 30 creates print image data of the object repeatedly arranged with the inputted length. Then, when the print button 118 is operated in the repetitive printing execution screen 110, the control application 30 creates print image data of the object repeatedly arranged with the size inputted through the operation of the length setting button 114 and the cut option setting button 116, and transmits the print image data to the printer 50. In this manner, the repetitive print processing is executed by the printer 50.

Figure 6:
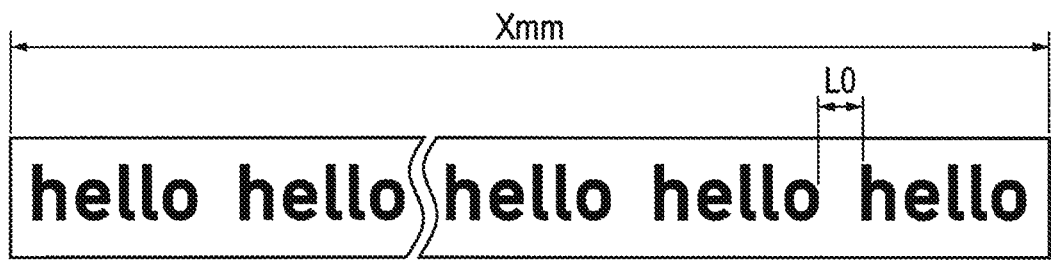
FIG. 6 is a diagram showing an image in which an object is repeatedly arranged such that the overall length is X mm.

For example, in a case where the length inputted through the length setting button 114 (hereinafter referred to as "overall input length") (one example of the image length) is X mm (millimeters) and where the size of the margin between objects inputted through the margin setting button 117 (hereinafter referred to as "inputted margin") is L0 mm, the control application 30 creates print image data of an image in which the object is repeatedly arranged with the inputted margin L0 such that the overall length is X mm, and transmits the print image data to the printer 50. As a result, as shown in FIG. 6, an image in which the object is repeatedly arranged with the inputted margin L0 is printed on a tape-like print medium of X mm.

The control application 30 transmits a job including the print image data to the printer 50. The job includes a cut command corresponding to a cut option selected in the cut-option setting screen 120. Specifically, when the first selection button 122 is operated in the cut-option setting screen 120, each of transmitted jobs includes a cut command "ON". This causes the printer 50 to cut the print medium after completing the print processing based on the cut command "ON" each time the print processing based on the print image data included in the received job is executed. When the second selection button 124 is operated in the cut-option setting screen 120, the job includes the number of print copies and the cut command "ON" to execute the cutting operation after the printing of the number of print copies is completed. This causes the printer 50 to execute, based on the print image data included in the received job, the print processing of the number of copies corresponding to the number of print copies included in the job, and subsequently cut the print medium based on the cut command "ON". When the third selection button 126 is operated in the cut-option setting screen 120, a transmitted job includes a cut command "OFF". This causes the printer 50 to execute the print processing of the print image data included in the received job without cutting the print medium based on the cut command "OFF".

Because the printer 50 is a thermal printer as described above, there is a possibility that a printing malfunction may occur if printing time becomes long and a thermal head becomes excessively hot. To prevent this, in the conventional repetitive print processing, the maximum overall length of a print medium is set to a length that can be printed by a single print processing, and the overall length of the print medium is limited to the maximum length. Specifically, the maximum length of the print medium is set to 999 mm (one example of set length and particular length) and the overall length of the print medium is limited to 999 mm or less. Thus, the overall input length that can be inputted through the length setting button 114 in the repetitive printing execution screen 110 is also limited to 999 mm.

However, obviously, some users desire the repetitive print processing to be performed on a tape-like print medium having a length longer than or equal to 1000 mm. In view of this, in the present embodiment, the overall input length longer than or equal to 1000 mm can be inputted through the operation of the length setting button 114. In a case where the overall input length longer than or equal to 1000 mm is inputted, the control application 30 creates print image data of an image in which an object is repeatedly arranged such that the image length is 999 mm (hereinafter referred to as "first image") and print image data of an image in which an object is repeatedly arranged such that the image length is a length obtained by subtracting the length of the first image (999 mm) from the overall input length (hereinafter referred to as "second image").

Figure 7A:
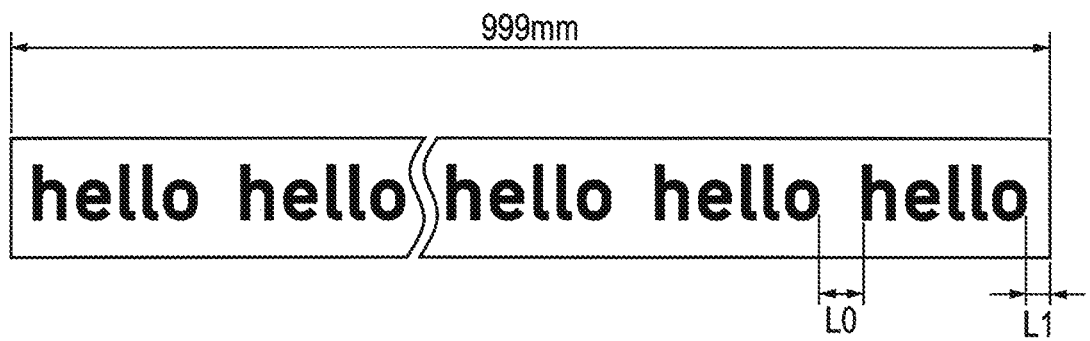
FIG. 7A is a diagram showing a first image in which the object is repeatedly arranged such that the overall length is 999 mm.

Specifically, as shown in FIG. 7A, in a case where the overall input length is 1500 mm and the inputted margin is L0 mm, the control application 30 creates the print image data of the first image in which an object is repeatedly arranged with the inputted margin L0 such that the image length is 999 mm. Then, the control application 30 creates the print image data of the second image so as to continue from the final part (the right-end part) of the first image. For example, when the final part of the first image is in a margin between objects, the print image data of the second image is created such that the starting part (the left-end part) of the second image is in the margin and that the inputted margin L0 is equal to the total of the length of the margin at the final part of the first image and the length of the margin at the starting part of the second image.

Figure 7B:
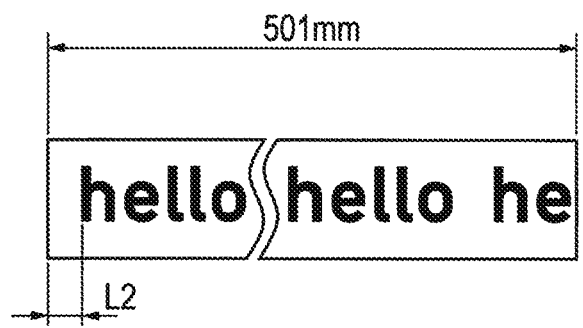
FIG. 7B is a diagram showing a second image in which the object is repeatedly arranged such that the overall length is 501 mm.

Specifically, in a case where the final part of the first image is in a margin between objects, the control application 30 calculates the length (L1) of the margin at the final part of the first image. Here, the control application 30 analyzes the print image data of the first image to identify a region at the final part of the first image in which no character string is arranged, and calculates the length of the region as the length (L1) of the margin at the final part of the first image. Next, as shown in FIG. 7B, the control application 30 arranges the first object such that the margin at the starting part of the second image has a length (L2) obtained by subtracting, from the inputted margin L0, the length (L1) of the margin at the final part of the first image (L0-L1), and repeatedly arranges the subsequent objects with the inputted margin L0. During this, the control application 30 repeatedly arranges the objects such that that the second image has the overall length (501 mm) obtained by subtracting, from the overall input length (1500 mm), the length (999 mm) of the first image. The control application 30 creates the print image data of the second image by repeatedly arranging the objects in the manner as described above.

Upon creating the print image data of the first image, the control application 30 sets a cut command "OFF" to a job including the print image data of the first image even when the first selection button 122 or the second selection button 124 is operated in the cut-option setting screen 120. Upon creating the print image data of the second image, the control application 30 sets a cut command "ON" to a job including the print image data of the second image when the first selection button 122 or the second selection button 124 is operated in the cut-option setting screen 120. Then, the control application 30 transmits the job including the print image data of the first image to the printer 50 and subsequently transmits the job including the print image data of the second image to the printer 50.

Figure 8:
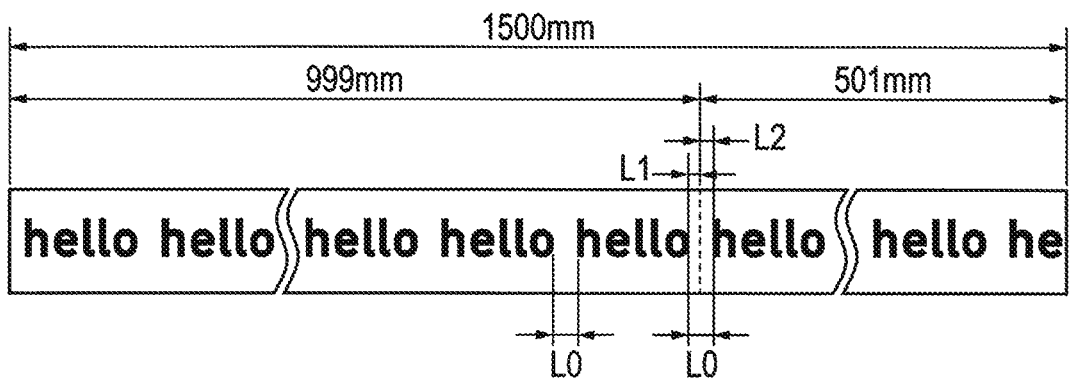
FIG. 8 is a diagram showing a print medium of 1500 mm on which the first image and the second image shown in FIGS. 7A and 7B are printed.

Thus, the printer 50 firstly executes the print processing based on the print image data of the first image to print a first image of 999 mm length on a print medium. The print medium is not cut based on the cut command "OFF" after completing the printing of the first image. Then, after the first image is printed on the print medium, the print processing based on the print image data of the second image is executed, and a second image of 501 mm length is printed to be continuous from the final part of the first image on the print medium on which the first image is printed. After the printing of the second image is completed, the print medium is cut based on the cut command "ON". Thus, as shown in FIG. 8, the first image of 999 mm length and the second image of 501 mm length continuing from the final part of the first image are printed on one print medium of 1500 mm length. In this way, the repetitive print processing is executed on a print medium of 1000 mm or longer. In a case where the final part of the first image is in a margin between objects, the length of the margin at the starting part of the second image is set in consideration of the length of the margin at the final part of the first image. This allows the margin between the first image and the second image to be set to an appropriate length, that is, the inputted margin L0.

Figure 9A:
FIG. 9A is a diagram showing a first image in which the object is repeatedly arranged such that the overall length is 999 mm.
Figure 9B:
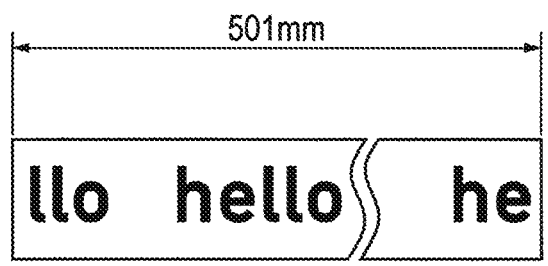
FIG. 9B is a diagram showing a second image in which the object is repeatedly arranged such that the overall length is 501 mm.
Figure 10:
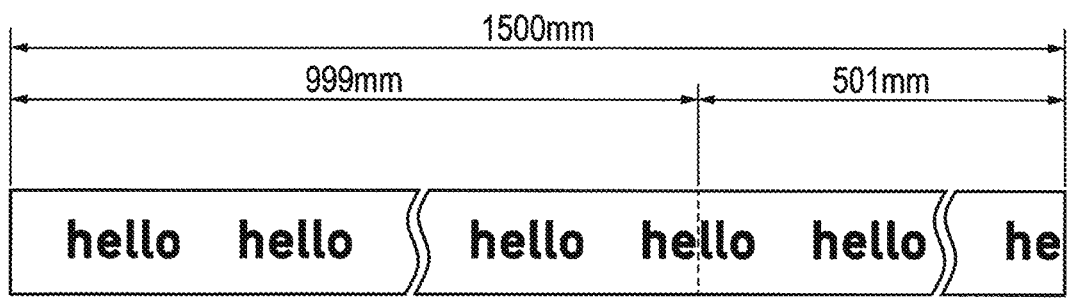
FIG. 10 is a diagram showing a print medium of 1500 mm on which the first image and the second image shown in FIGS. 9A and 9B are printed.

In the example shown in FIG. 7A, in a case where the inputted margin is L0, the final part of the first image is in a margin between objects. Alternatively, as shown in FIG. 9A, depending on the value of the inputted margin, the final part of the first image is not in a margin between objects and is in the middle of the object. Even in such a case, the second image is formed to be continuous from the final part of the first image. Specifically, in the printer 50, a sub-scanning direction is a direction along which a tape-like print medium extends, that is, a direction in which the object is repeatedly arranged in the repetitive print processing. The control application 30 creates print image data for each line extending in a direction perpendicular to the sub-scanning direction, that is, each line extending in the main scanning direction. Thus, as shown in FIG. 9B, in a case where the final part of the first image is in the middle of an object and the line at the end of the print image data of the first image is the Nth line of the object, the control application 30 creates the print image data of the second image such that the starting line of the second image is the (N+1)th line of the object. As a result, as shown in FIG. 10, when the printer 50 sequentially executes the print processing based on the print image data of the first image and the print processing based on the print image data of the second image in this order, the image is printed appropriately in a state where the object at the final part of the first image and the object at the starting part of the second image are continuous.

Figure 11:
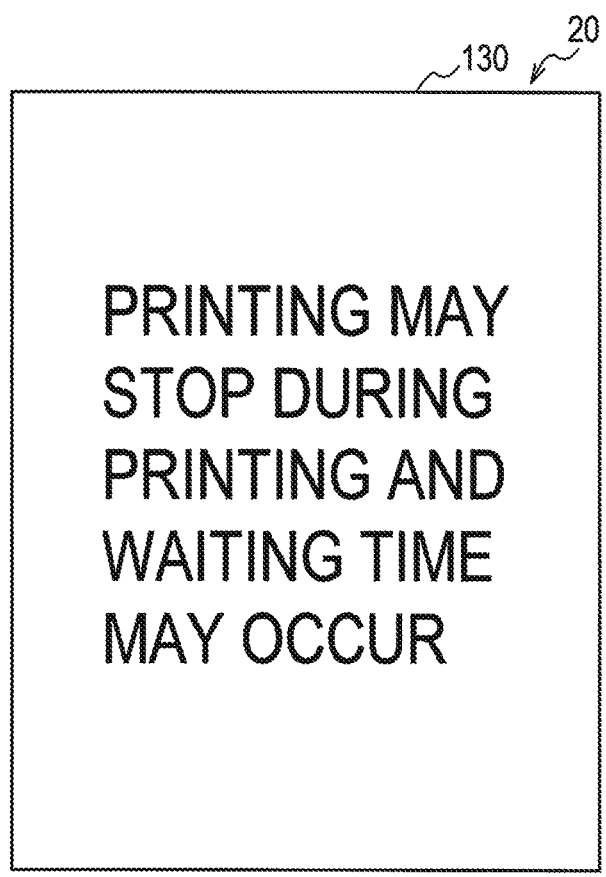
FIG. 11 is a diagram showing a notification screen 130.

The printer 50 is configured, after the print processing based on the print image data of the first image is executed, to stop the print processing for a predetermined time in order to cool the thermal head, and subsequently execute the print processing based on the print image data of the second image. That is, there is a waiting time to cool the thermal head between the print processing based on the print image data of the first image and the print processing based on the print image data of the second image. Thus, the control application 30 controls the LCD 20 to display a notification screen 130 shown in FIG. 11 before transmitting the print image data of the first image and the print image data of the second image to the printer 50. The notification screen 130 displays a comment that printing may stop during the printing. Thus, consideration is given so that a user is not bewildered when printing stops in the middle of a printing operation.

In the above description, the template image 72a is selected in the selection screen 70 and a character string "hello" is selected as the object of the print target. When the template image 72c is selected in the selection screen 70, the object of the print target is a character string "John Smith". This character string "John Smith" includes a space in the middle of the character string, in contrast to the character string "hello". In a case where the character string includes a space in the middle thereof, a user may feel unnatural regarding objects that are repeatedly arranged in an image printed by the repetitive print processing.

Figure 12:
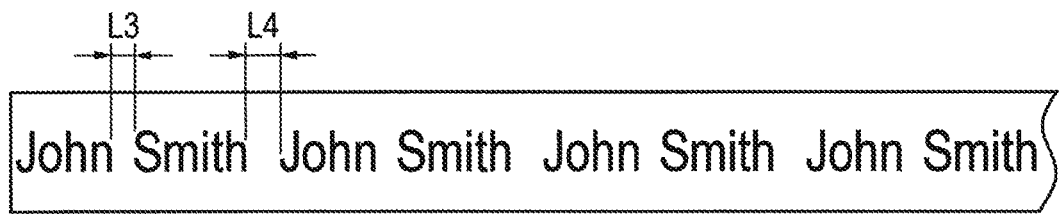
FIG. 12 is a diagram showing an image in which a character string "John Smith" is repeatedly arranged.
Figure 13:
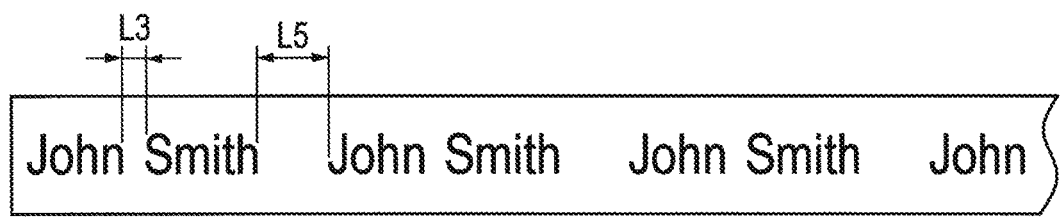
FIG. 13 is a diagram showing an image in which the character string "John Smith" is repeatedly arranged with different margin from FIG. 12.

Specifically, as shown in FIG. 12, the character string "John Smith" has a space of a length L3 (referred to as "space L3") between "John" and "Smith". In this way, if the character string "John Smith" including the space L3 is repeatedly arranged with an inputted margin L4 and the length of the space L3 is approximately equal to the length of the inputted margin L4, it may be difficult for a user to recognize the character string "John Smith" as one object and the user may feel unnatural. In view of this, in a case where an object includes a character string including a space therein, the control application 30 sets a margin between objects to be five times the length of the space L3, regardless of the inputted margin L0. More specifically, in a case where an object includes a character string including a space therein, the control application 30 calculates the length of the space. The control application 30 analyzes the text data of the character string to identify a region in which no character is arranged in the middle of the character string, and calculates the length of the region as the length (L3) of the space. Then, the control application 30 sets five times the length of the space L3 as a new margin L5 (=L3×5) between objects. Thus, the control application 30 creates the print image data of such an image that is obtained by repeatedly arranging the character string "John Smith" with the margin L5, not with the inputted margin L0. With this operation, as shown in FIG. 13, the character string "John Smith" is repeatedly arranged with the margin L5 that is five times the length of the space L3. Thus, the user recognizes the character string "John Smith" as one object, thereby preventing the user from feeling unnatural.

Figure 14:
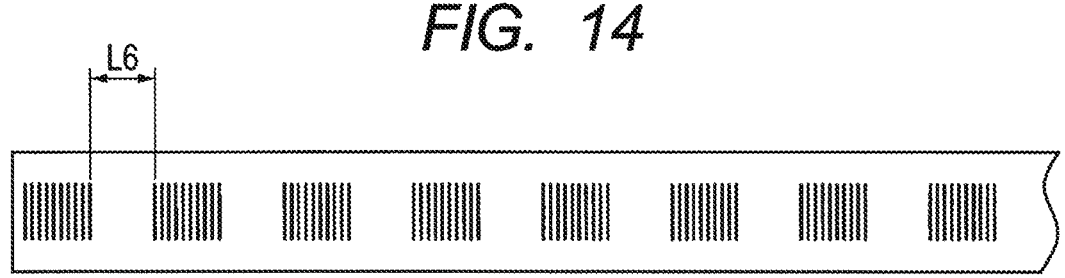
FIG. 14 is a diagram showing an image in which a barcode is repeatedly arranged.

In a case where the template image 72d is selected in the selection screen 70, the object of the print target is a barcode. If a barcode is printed with an inputted margin of a small value in the repetitive print processing, there is a possibility that the barcode may not be appropriately read. Specifically, as shown in FIG. 14, if the barcode is repeatedly arranged with the inputted margin L6 of a small value, the margin between two barcodes arranged adjacent to each other is very narrow. In such a case, when a reading operation is performed by a barcode reader, multiple barcodes adjacent to one another are read by one reading operation, and thus the barcodes cannot be read appropriately.

Figure 15:
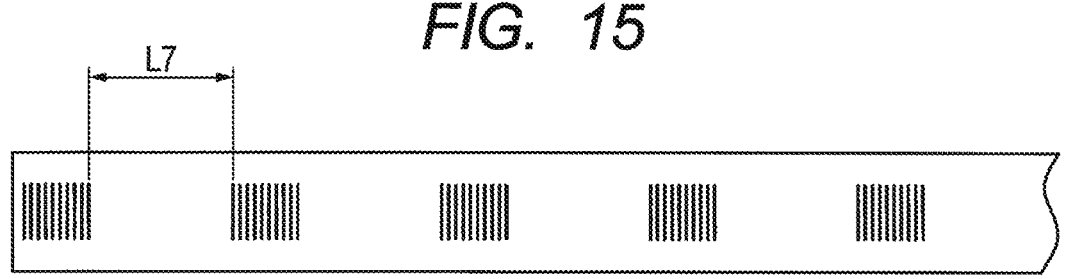
FIG. 15 is a diagram showing an image in which the barcode is repeatedly arranged with different margin from FIG. 14.

In view of this, in a case where an object includes a barcode, the control application 30 sets the margin between objects to a margin for barcode L7 that is preliminarily set, regardless of the inputted margin L0. The margin for barcode L7 is set to a length in consideration of the size of the reading section of the barcode reader and is relatively long. Thus, the control application 30 creates the print image data of an image in which the barcode is repeatedly arranged with the margin for barcode L7, not with the inputted margin L0. Thus, as shown in FIG. 15, the barcode is repeatedly arranged with the relatively-long margin for barcode L7. Thus, only one barcode is read by one reading operation, thereby securing an appropriate barcode reading operation.

The above-described print processing is performed by executing the control application 30 by the CPU 12. The processing of executing the flow of the control application 30 will be described below with reference to FIG. 16 and FIG. 17.

When the print button is operated, the control application 30 receives a print instruction for the editing image 82 in the editing screen 80 (S100). The print instruction includes an overall input length inputted through the length setting button 114 and the inputted margin L0 inputted through the margin setting button 117. Next, the control application 30 determines whether a template image as the basis of the editing image 82 for the print instruction, that is, the template image selected in the selection screen 70 is compatible with repetitive print processing (S102).

In response to determining that the selected template image is compatible with the repetitive print processing (S102: YES), the control application 30 determines whether the overall input length included in the print instruction received in S100 is longer than or equal to 1000 mm (S104). In response to determining that the overall input length is longer than or equal to 1000 mm (S104: YES), the control application 30 determines whether the object includes a barcode (S106). In response to determining that the object includes a barcode (S106: YES), the control application 30 sets the margin between objects to the margin for barcode L7 (S108). Then, the processing proceeds to S110.

In response to determining that the object does not include a barcode (S106: NO), the control application 30 determines whether there is a space in the middle of the character string in the object (S112). In response to determining that there is a space in the middle of the character string (S112: YES), the control application 30 sets the margin between objects to five times the length of the space L3 existing in the middle of the character string (S113). Then, the processing proceeds to S110. In response to determining that there is no space in the middle of the character string (S112: NO), the control application 30 sets the margin between objects to the inputted margin L0 included in the print instruction received in S100 (S114). Then, the processing proceeds to S110.

In S110, the control application 30 creates the print image data of the first image, that is, an image in which an object is repeatedly arranged such that the overall input length is 999 mm (S110). Next, the control application 30 creates the print image data of the second image, that is, an image in which the object is repeatedly arranged such that the overall length is a length obtained by subtracting 999 mm from the overall input length) (S112). Then, the control application 30 determines whether the cut option set in the cut-option setting screen 120 is "automatic cut" or "cut final label" (S116).

In response to determining that the cut option is "automatic cut" or "cut final label" (S116: YES), the control application 30 sets the cut command "OFF" to a job including the print image data of the first image (S117). Next, the control application 30 sets the cut command "ON" to a job including the print image data of the second image (S118). Then, the processing proceeds to S120. In response to determining in S116 that the cut option is neither "automatic cut" nor "cut final label" (S116: NO), the processing in S117 and S118 is skipped to proceed to S120.

In S120, the control application 30 displays a notification screen 130 on the LCD 20 (S120). Then, the control application 30 transmits a job including the print image data to the printer 50 (S122). Then, this flow is completed.

In response to determining that the overall input length is shorter than 1000 mm (S104: NO), the control application 30 creates image data for repetitive printing, that is, the print image data of an image (an example of a third image) in which an object is repeatedly arranged such that the overall length is the overall input length (S124). Then, the control application 30 transmits a job including the print image data to the printer 50 (S122). Then, this flow is completed.

In response to determining that the selected template image is not compatible with the repetitive print processing (S102: NO), the control application 30 creates image data for normal label printing, that is, the print image data of an image in which one object is arranged without repeatedly arranging the object (S126). Then, the control application 30 transmits a job including the print image data to the printer 50 (S122). Then, this flow is completed.

According to the above-described embodiment, even if the image length is longer than the set length, an image in which an object is arranged repeatedly can be printed appropriately on a tape-like print medium.

The CPU 12 that executes S100 is an example of reception means. The CPU 12 that executes S104 is an example of determination means. The CPU 12 that executes S108 is an example of second setting means. The CPU 12 that executes S110 and S115 is an example of first creation means. The CPU 12 that executes S113 is an example of first setting means. The CPU 12 that executes S120 is an example of notification means. The CPU 12 that executes S122 is an example of output means. The CPU 12 that executes S124 is an example of second creation means.

While the disclosure has been described in detail with reference to the above aspects thereof, it would be apparent to those skilled in the art that various changes and modifications may be made therein without departing from the scope of the claims.

Figure 18A:
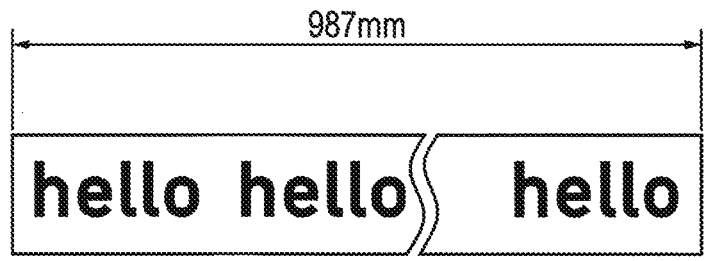
FIG. 18A is a diagram showing a first image in which the objects are repeatedly arranged such that the overall length is 987 mm.
Figure 18B:
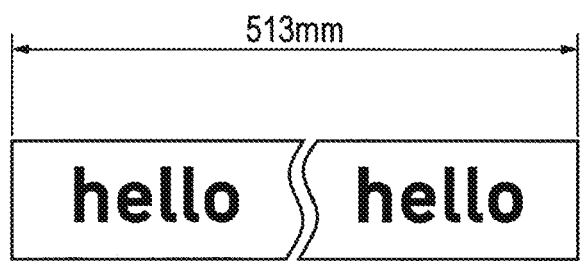
FIG. 18B is a diagram showing a second image in which the objects are repeatedly arranged such that the overall length is 513 mm.
Figure 19:
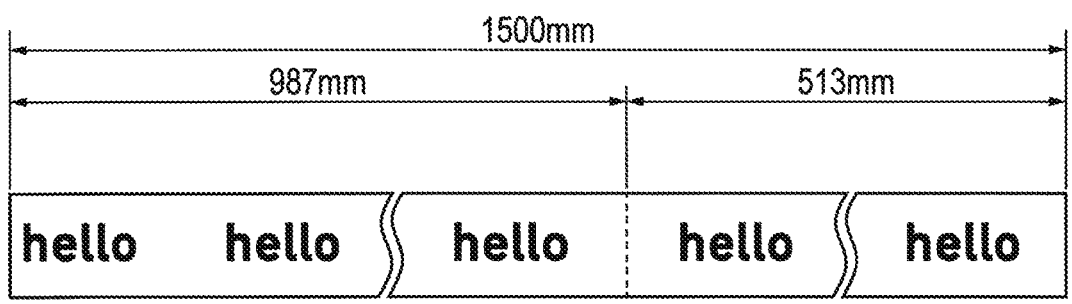
FIG. 19 is a diagram showing a print medium of 1500 mm on which the first image and the second image shown in FIGS. 18A and 18B are printed.

For example, in the above-described embodiment, the object is repeatedly arranged such that the first image has the overall length of 999 mm. However, the first image may have an arbitrary overall length as long as the first image has the overall length of 999 mm or less and the length obtained by subtracting the overall length of the first image from the overall input length is 999 mm or less. Specifically, as shown in FIG. 9A for example, when the object is repeatedly arranged such that the first image has the overall length of 999 mm, the final part of the first image may be in the middle of the object. In such a case, as shown in FIG. 18A for example, when the object is repeatedly arranged such that the first image has the overall length of 987 mm, the final part of the first image is in a margin between objects, not in the middle of the object. In this way, the overall length of the first image may be set such that the final part of the first image is in a margin between objects. For example, the overall length of the first image for which the final part is in a margin between objects is larger than a length Y that is the integral multiple of the sum of the object length and the inputted margin L0, and is smaller than a length (Y+L0) that is obtained by adding the inputted margin L0 to the length Y. The overall length of the second image is obtained by subtracting the overall length of the first image from the overall input length, and thus is set to 513 (=1500−987) mm. Thus, as shown in FIG. 18B, the second image is an image that continues from the final part of the first image and that includes an object repeatedly arranged such that the overall length is 513 mm. Thus, as shown in FIG. 19, in a case where the first image having the overall length of 987 mm and the second image having the overall length of 513 mm are formed, an image in which the object is repeatedly arranged can be appropriately printed on a print medium having the length of 1500 mm. In a case where a print medium of the overall length of 2000 mm or longer is specified, the control program generates a plurality of first images having the overall length of 999 mm.

Although in the above-described embodiment the thermal printer is adopted as a printer that executes repetitive print processing, printers of various types may be adopted. This is because, in the printers of various types other than thermal printers, there is a possibility that the overall length of a print medium that is printed at a time is limited due to various reasons.

Figure 16:
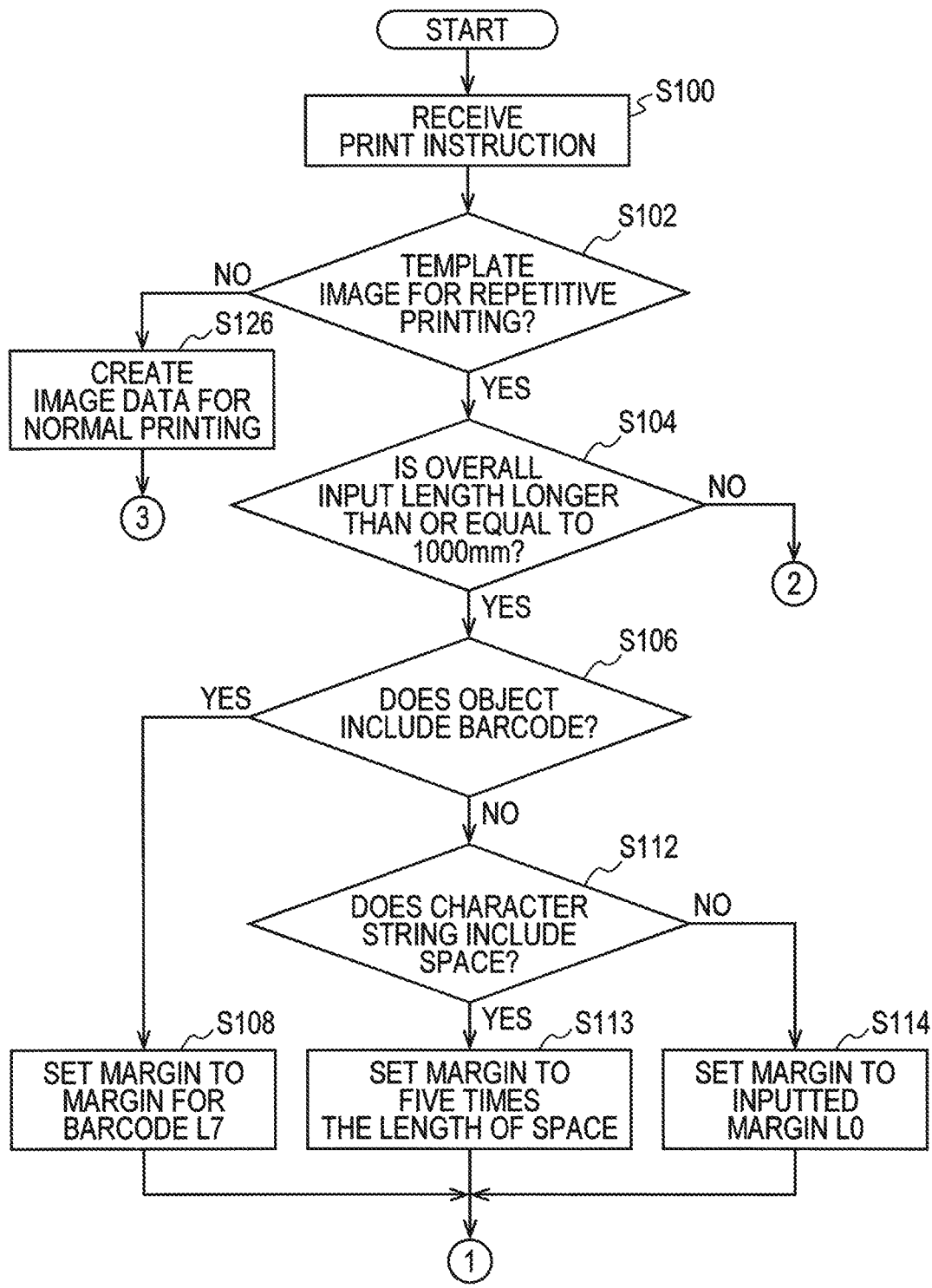
FIG. 16 is a flowchart showing a part of a control application 30.
Figure 17:
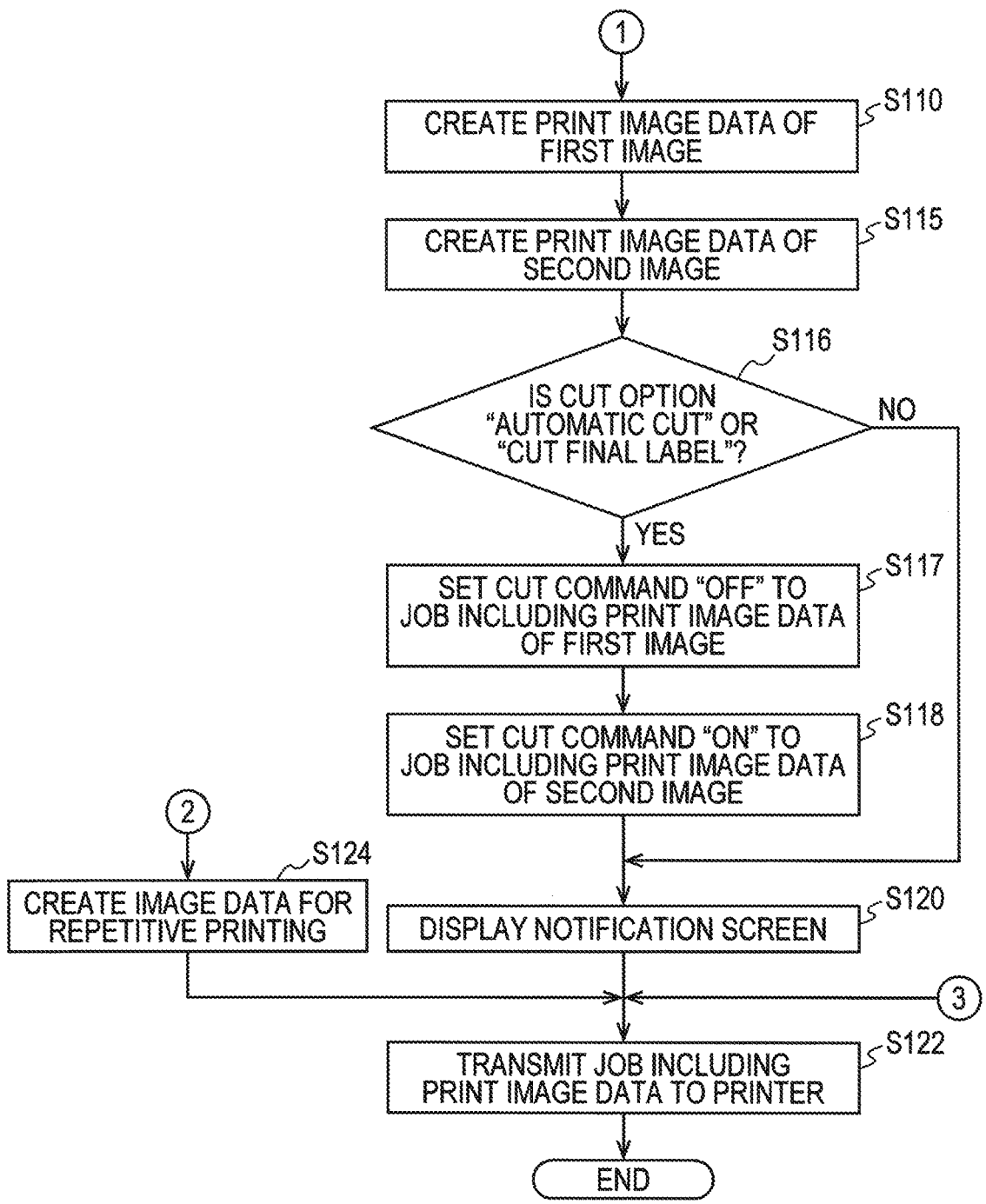
FIG. 17 is a flowchart showing the remaining part of the control application 30.

In the above-described embodiment, the CPU 12 executes the processing shown in FIGS. 16 and 17. These processing is not necessarily executed by the CPU 12 but may be executed by an ASIC or other logic integrated circuit or may be executed by a CPU, an ASIC, and other logic integrated circuits in cooperation with one another.

What is claimed is:

1. A non-transitory computer-readable storage medium storing a control program including a set of program instructions for an information processing apparatus comprising a processor and a communication interface, the set of program instructions, when executed by the processor, causing the information processing apparatus to perform:

receiving a print instruction for repeatedly printing an object along a particular direction, the print instruction including an image length that is a length of an image to be printed based on the print instruction, the image length being a length in the particular direction in which the object is repeatedly arranged;

determining whether the image length exceeds a particular length that is set preliminarily;

in a case where the image length exceeds the particular length, creating print image data of a first image and print image data of a second image, the first image including the object arranged repeatedly based on the print instruction, a length of the first image being within the particular length, the second image continuing from a final part of the first image, the second image including the object arranged repeatedly based on the print instruction, a total length of the first image and the second image being equal to the image length, the creating the print image data including:

setting a set margin length L0 as a length of a margin between two objects arranged adjacently in the image in which the object is arranged repeatedly;

creating the print image data of the first image such that the final part of the first image is in the margin;

creating the print image data of the second image such that, in a case where the final part of the first image is in the margin, a starting part of the second image continuing from the final part of the first image is in the margin and a length of the margin at the starting part of the second image is equal to a length obtained by subtracting, from the set margin length L0, a length of the margin at the final part of the first image; and setting a length of the first image and a length of the second image such that:

the length of the first image is larger than a length Y that is an integral multiple of a sum of a length of the object and the set margin length L0, and is smaller than a length (Y+L0) that is obtained by adding the set margin length L0 to the length Y; and the length of the second image is obtained by subtracting the length of the first image from the image length;

in a case where the image length does not exceed the particular length, creating print image data of a third image in which the object is arranged repeatedly based on the print instruction, a length of the third image being equal to the image length; and outputting the created print image data to a printer through the communication interface.

2. The non-transitory computer-readable storage medium according to claim 1, wherein the set of program instructions, when executed by the processor, causes the information processing apparatus to:

create the print image data line by line, each line extending in a direction intersecting the particular direction; and create the print image data of the second image such that a final line of the first image is Nth line and a starting line of the second image is (N+1)th line.

3. The non-transitory computer-readable storage medium according to claim 1, wherein the set of program instructions, when executed by the processor, causes the information processing apparatus to:

in a case where the print instruction includes a cut setting of cutting a print medium after an image is printed on the print medium based on the print instruction, output a cut command of cutting the print medium together with the print image data of the second image, without outputting the cut command together with the print image data of the first image.

4. The non-transitory computer-readable storage medium according to claim 1, wherein the set of program instructions, when executed by the processor, causes the information processing apparatus to:

in a case where the print image data of the first image and the second image is created, output a notification that waiting time occurs between print processing based on the print image data of the first image and print processing based on the print image data of the second image.

5. The non-transitory computer-readable storage medium according to claim 1, wherein the set of program instructions, when executed by the processor, causes the information processing apparatus to:

in a case where the object is a character string including a space between characters, perform a setting such that a length of a margin is larger than a length of the space, the margin being a region between two objects arranged adjacently in the image in which the object is arranged repeatedly.

6. The non-transitory computer-readable storage medium according to claim 1, wherein the set of program instructions, when executed by the processor, causes the information processing apparatus to:

in a case where the object is of a particular type, set a length of a margin between two objects arranged adjacently to a preset length.

7. The non-transitory computer-readable storage medium according to claim 6, wherein the set of program instructions, when executed by the processor, causes the information processing apparatus to:

in a case where the object is a code that is readable by a code reader, set the length of the margin to a margin for code that is set preliminarily, the margin for code having a length that is set in consideration of a size of a reading section of the code reader.

8. An information processing apparatus comprising:

a communication interface;

a processor; and a memory storing set of instructions, the instructions, when executed by the processor, causing the information processing apparatus to perform:

receiving a print instruction for repeatedly printing an object along a particular direction, the print instruction including an image length that is a length of an image to be printed based on the print instruction, the image length being a length in the particular direction in which the object is repeatedly arranged;

determining whether the image length exceeds a particular length that is set preliminarily;

in a case where the image length exceeds the particular length, creating print image data of a first image and print image data of a second image, the first image including the object arranged repeatedly based on the print instruction, a length of the first image being within the particular length, the second image continuing from a final part of the first image, the second image including the object arranged repeatedly based on the print instruction, a total length of the first image and the second image being equal to the image length, the creating the print image data including:

setting a set margin length L0 as a length of a margin between two objects arranged adjacently in the image in which the object is arranged repeatedly;

creating the print image data of the first image such that the final part of the first image is in the margin;

creating the print image data of the second image such that, in a case where the final part of the first image is in the margin, a starting part of the second image continuing from the final part of the first image is in the margin and a length of the margin at the starting part of the second image is equal to a length obtained by subtracting, from the set margin length L0, a length of the margin at the final part of the first image; and setting a length of the first image and a length of the second image such that:

the length of the first image is larger than a length Y that is an integral multiple of a sum of a length of the object and the set margin length L0, and is smaller than a length (Y+L0) that is obtained by adding the set margin length L0 to the length Y; and the length of the second image is obtained by subtracting the length of the first image from the image length;
in a case where the image length does not exceed the particular length, creating print image data of a third image in which the object is arranged repeatedly based on the print instruction, a length of the third image being equal to the image length; and
outputting the created print image data to a printer through the communication interface.

9. The information processing apparatus according to claim 8, wherein the set of instructions, when executed by the processor, causes the information processing apparatus to:
create the print image data line by line, each line extending in a direction intersecting the particular direction; and
create the print image data of the second image such that a final line of the first image is Nth line and a starting line of the second image is (N+1)th line.

10. The information processing apparatus according to claim 8, wherein the set of instructions, when executed by the processor, causes the information processing apparatus to:
in a case where the print instruction includes a cut setting of cutting a print medium after an image is printed on the print medium based on the print instruction, output a cut command of cutting the print medium together with the print image data of the second image, without outputting the cut command together with the print image data of the first image.

11. The information processing apparatus according to claim 8, wherein the set of instructions, when executed by the processor, causes the information processing apparatus to:
in a case where the print image data of the first image and the second image is created, output a notification that waiting time occurs between print processing based on the print image data of the first image and print processing based on the print image data of the second image.

12. The information processing apparatus according to claim 8, wherein the set of instructions, when executed by the processor, causes the information processing apparatus to:
in a case where the object is a character string including a space between characters, perform a setting such that a length of a margin is larger than a length of the space, the margin being a region between two objects arranged adjacently in the image in which the object is arranged repeatedly.

13. The information processing apparatus according to claim 8, wherein the set of instructions, when executed by the processor, causes the information processing apparatus to:
in a case where the object is of a particular type, set a length of a margin between two objects arranged adjacently to a preset length.

* * * * *